United States Patent
Claus et al.

(10) Patent No.: US 9,908,603 B2
(45) Date of Patent: Mar. 6, 2018

(54) MAGNETICALLY GEARED ELECTRIC DRIVE

(71) Applicant: Memorial University of Newfoundland, St. John's (CA)

(72) Inventors: Brian Claus, St. John's (CA); Ralf Bachmayer, St. John's (CA); Levi MacNeil, Mount Pearl (CA)

(73) Assignee: Memorial University of Newfoundland, St. John, Newfoundland (CA)

( * ) Notice: Subject to any disclaimer, the term of this patent is extended or adjusted under 35 U.S.C. 154(b) by 0 days.

(21) Appl. No.: 15/117,028

(22) PCT Filed: Feb. 6, 2015

(86) PCT No.: PCT/CA2015/000070
§ 371 (c)(1),
(2) Date: Aug. 5, 2016

(87) PCT Pub. No.: WO2015/117231
PCT Pub. Date: Aug. 13, 2015

(65) Prior Publication Data
US 2017/0166288 A1    Jun. 15, 2017

Related U.S. Application Data

(60) Provisional application No. 61/936,656, filed on Feb. 6, 2014.

(51) Int. Cl.
*B63H 21/17*    (2006.01)
*H02K 51/00*    (2006.01)
(Continued)

(52) U.S. Cl.
CPC ............... *B63H 21/17* (2013.01); *B63G 8/08* (2013.01); *B63H 5/14* (2013.01); *B63H 23/24* (2013.01);
(Continued)

(58) Field of Classification Search
CPC .......... B60L 9/00; B63H 23/00; B63H 23/24; H02K 7/11; H02K 51/00; H02K 11/04;
(Continued)

(56) References Cited

U.S. PATENT DOCUMENTS 3,914,629 A * 10/1975 Gardiner ................. H02K 7/14
440/6
5,306,183 A * 4/1994 Holt ......................... B63H 5/14
440/6
(Continued)

OTHER PUBLICATIONS

Canadian Patent Office; Search Report and Written Opinion in International Patent Application No. PCT/CA2015/000070 dated May 5, 2015.

*Primary Examiner* — Lars A Olson
(74) *Attorney, Agent, or Firm* — Wood Herron & Evans LLP

(57) ABSTRACT

The invention provides an encapsulated magnetically geared brushless electric marine propulsion system with the principle components arranged axially around the central shaft. The marine propulsion system includes: the brushless DC motor, comprised of the stator fixed to the central shaft and motor magnets fixed within the motor rotor coupled to the central shaft using precision ball bearings; the high-speed magnetic gear rotor coupled to the motor rotor comprising an alternating array of magnets fixed to a ferromagnetic backing; the environmental barrier which protects the motor and additionally houses pole pieces to modulate magnetic flux; the low-speed magnetic gear rotor coupled to the central shaft and comprised of an alternating array of mag-
(Continued)

nets fixed to a ferromagnetic backing; the propeller coupled to the low-speed magnetic gear rotor; and the shroud coupled to the struts of the motor mounting system.

2 Claims, 9 Drawing Sheets

(51) Int. Cl.
| | | |
|---|---|---|
| H02K 5/00 | (2006.01) | |
| H02K 49/10 | (2006.01) | |
| B63H 23/24 | (2006.01) | |
| H02K 5/132 | (2006.01) | |
| H02K 7/08 | (2006.01) | |
| B63H 5/14 | (2006.01) | |
| B63G 8/08 | (2006.01) | |
| H02K 7/11 | (2006.01) | |
| H02K 5/124 | (2006.01) | |
| H02K 16/00 | (2006.01) | |
| H02K 5/128 | (2006.01) | |

(52) U.S. Cl.
CPC ............. *H02K 5/00* (2013.01); *H02K 5/132* (2013.01); *H02K 7/083* (2013.01); *H02K 7/11* (2013.01); *H02K 49/102* (2013.01); *H02K 51/00* (2013.01); *H02K 5/124* (2013.01); *H02K 5/1285* (2013.01); *H02K 16/00* (2013.01)

(58) Field of Classification Search
CPC .......... H02K 21/00; H02K 49/00; H02K 5/00; H02K 16/00; H02K 37/00; H02K 5/14; H02K 5/04; H02K 5/06; H02K 5/08; H02K 5/10; H02K 5/16; H02K 5/24; H02K 3/28; H02K 3/34; H02K 3/345; H02K 49/06; H02K 49/10; H02K 49/102
USPC .................... 440/6; 310/71, 87, 89, 91, 103
See application file for complete search history.

(56) References Cited

U.S. PATENT DOCUMENTS

| | | | |
|---|---|---|---|
| 7,294,944 | B2 | 11/2007 | Fujii |
| 8,299,669 | B2 * | 10/2012 | Gieras .................. B63H 23/24 310/87 |
| 8,358,044 | B2 | 1/2013 | Waszak et al. |
| 8,968,042 | B2 | 3/2015 | Calverley et al. |
| 2007/0290562 | A1 | 12/2007 | Takizawa et al. |

* cited by examiner

MAGNETICALLY GEARED ELECTRIC DRIVE

FIELD OF THE INVENTION

The present invention relates to an electric drive, and more particularly to a magnetically geared electric drive. Specifically, the present invention relates to an encapsulated magnetically geared brushless electric drive arranged around a central shaft or external shell.

BACKGROUND OF THE INVENTION

Autonomous underwater vehicle propulsion systems typically use electric motors with mechanical gearing to reduce the rotational speed, such that it is well matched to the peak operating point of a propeller [see, for e.g., B. Claus, R. Bachmayer, and C. D. Williams, "Development of an auxiliary propulsion module for an autonomous underwater glider," *Proceedings of the Institution of Mechanical Engineers, Part M: Journal of Engineering for the Maritime Environment*, vol. 224, no. 4, pp. 255-266, 2010. [Online]. Available: http://pim.sagepub.com/content/224/4/255.abstract; and M. E. Furlong, D. Paxton, and P. Stevenson, "Autosub long range: A long range deep diving AUV for ocean monitoring," in *Autonomous Underwater Vehicles (AUV)*, 2012 IEEE/OES, September 2012, pp. 1-7]. Alternative designs use a custom built direct drive brushless motor for reliability reasons but unfortunately they have higher losses and are significantly larger than their geared counterparts [see, for e.g., J. Bellingham, Y. Zhang, J. Kerwin, J. Erikson, B. Hobson, B. Kieft, M. Godin, R. McEwen, T. Hoover, J. Paul, A. Hamilton, J. Franklin, and A. Banka, "Efficient propulsion for the Tethys long-range autonomous underwater vehicle," in *Autonomous Underwater Vehicles (AUV)*, 2010 IEEE/OES, September 2010, pp. 1-7]. A magnetically coupled gearing system, however, has several significant advantages compared to classical mechanical gear reduction methods. For one, the lack of physical contact between rotating parts—other than engineered bearing surfaces—eliminates excessive mechanical wear and greatly reduces the effect of load disturbances. In addition, inherent overload protection resulting from the physical isolation of input and output rotors, prevents premature failure of components in the event of a sudden torque application. The lack of mechanical contact also leads to a reduction in vibrations and acoustic noise. Furthermore, a magnetic gear can eliminate the need for rotary shaft seals by isolating the motor and drive electronics from the environment with a barrier in the air gap. As a result, one can appreciate that a magnetic gear system is well suited for underwater vehicle propulsion systems where long term, maintenance-free application is an asset. Magnetic gearing itself has been the subject of fascination for well over one hundred years with patents on the subject first showing up as early as 1913 [see, for e.g., A. H. Neuland, "Apparatus for transmitting power," U.S. Pat. No. 1,171,351, 1916]. These early gears, however, were often complex machines with low torque density and did not see wide spread use [see, for e.g., H. T. Faus, "Magnet gearing," U.S. Pat. No. 2,243,555, 1941; K. Tsurumoto and S. Kikuchi, "A new magnetic gear using permanent magnet," *Magnetics, IEEE Transactions on*, vol. 23, no. 5, pp. 3622-3624, September 1987; and S. Kikuchi and K. Tsurumoto, "Design and characteristics of a new magnetic worm gear using permanent magnet," *Magnetics, IEEE Transactions on*, vol. 29, no. 6, pp. 2923-2925, November 1993]. More recently, in 2001 Atallah et al. presented an initial concept for a high torque density magnetic gear comprising three rotors, namely a high speed, low speed and modulating rotor containing ferromagnetic pole pieces [see K. Atallah and D. Howe, "A novel high-performance magnetic gear," *Magnetics, IEEE Transactions on*, vol. 37, no. 4, pp. 2844-2846, July 2001]. A follow up paper presented the experimental validation in which torque densities of up to 100 kNm/m3 with up to 97% efficiency and gear ratios of 2-12 were demonstrated [see K. Atallah, S. Calverley, and D. Howe, "Design, analysis and realisation of a high-performance magnetic gear," *Electric Power Applications, IEEE Proceedings*—, vol. 151, no. 2, pp. 135-143, March 2004].

What is needed, however, is a magnetically geared electric drive having a design that is intended and well suited for reliable, long term application in an underwater vehicle where efficiency of energy transmission is useful.

SUMMARY OF THE INVENTION

The present invention provides an environmentally sealed, magnetically geared electric drive that combines several distinct technical components into a single compact solution to be used for underwater vehicles, such as remotely operated vehicles (ROV), autonomous underwater vehicles (AUV) and human occupied underwater vehicles (HOV). The device consists essentially of a motor stator, motor rotor, high-speed inner magnetic gear rotor, encapsulated pole pieces, and encapsulated low-speed outer magnetic gear rotor, all arranged around a central shaft. The combination of these elements into a single underwater electric drive device provides a low maintenance, reliable, and efficient configuration for underwater drive applications. An advantage of this system is the simplified arrangement around a central shaft which allows for multiple stages of gearing. Another advantage of this system is that by combining encapsulation technology with magnetic gear technology, the entire device can be made smaller and lighter, and thereby improving the power density of the device.

In one embodiment, the invention comprises an encapsulated magnetically geared brushless electric drive consisting essentially of the following components: a motor mounting system coupled to a first distal end of a central shaft, said mounting system comprising a water proof shell with a rigid flange connected to struts, and including water-tight ports for receiving power and command input; a DC motor coupled to the motor mounting system, comprising a motor stator fixed to the central shaft and motor magnets fixed within a motor rotor which is coupled to the central shaft using precision ball bearings; a high-speed inner magnetic gear rotor coupled to the motor rotor comprising an alternating array of magnets fixed to a ferromagnetic backing; an environmental barrier coupled to the motor mounting system that seals against the motor mounting system and central shaft by means of O-ring seals, and that further houses pole pieces to modulate magnetic flux; a low-speed outer magnetic gear rotor coupled to a second distal end of the central shaft comprising an alternating array of magnets fixed to a ferromagnetic backing; a propeller coupled to the low-speed outer magnetic gear rotor; and a shroud coupled to the struts of the motor mounting system, wherein each of said components are arranged axially around the central shaft using spacers and mechanical stops, and wherein said components are held in place by means of one of keys or bearings.

In another embodiment, the invention comprises an encapsulated magnetically geared brushless electric drive consisting essentially of the following components: a motor enclosure system that is coupled to a first distal end of a central shaft; a DC motor stator coupled to the motor enclosure system, said stator encapsulated with potting compound; a DC motor rotor coupled to the DC motor stator, said motor rotor housing motor magnets, said motor magnets encapsulated with potting compound; a high-speed inner magnetic gear rotor coupled to the motor rotor comprising an alternating array of magnets fixed to a ferromagnetic backing, said high-speed inner magnetic gear rotor encapsulated with potting compound; an intermediate magnetic gear-ring coupled to the central shaft housing pole pieces, wherein said pole pieces are encapsulated with potting compound and contained within a pole piece fixture; a low-speed outer magnetic gear rotor coupled to the central shaft comprising an alternating array of magnets fixed to a ferromagnetic backing, said low-speed outer magnetic gear rotor encapsulated with potting compound; and a propeller coupled to the low-speed outer magnetic gear rotor, wherein each of said components are arranged axially around the central shaft using spacers and mechanical stops, and wherein said components are held in place by means of one of keys or bearings.

DETAILED DESCRIPTION OF THE INVENTION

The propulsion system design of the present invention is intended to increase the overall efficiency and reliability of current marine propulsion systems, and also has general ease of assembly and maintenance. It is powered by an environmentally isolated brushless DC motor driven by a high efficiency motor controller. Environmental isolation is made possible through the use of an environmental barrier which doubles as a portion of the magnetic gearing system or through encapsulation. Sensitive magnetic and ferrous components which remain outside of the barrier are encapsulated for environmental protection. All of the thruster components are arranged on a central shaft serving as a mechanical ground, thereby forming an elegant assembly. A static O-ring seal within the environmental barrier allows passage of the ground shaft between dry and wet sections. Thrust output is maximized through the use of a purpose-built propeller and shroud along with hydro-dynamically faired struts and nosecone.

While magnetic gearing and encapsulated motors are known concepts, combining them and arranging them around a central shaft in the manner disclosed herein is novel, and provides several key advantages that are particularly useful and applicable to the marine propulsion technology sector. First of all, magnetic gears themselves have been shown to be more efficient than their mechanical counterparts with demonstrated efficiencies often above 95%. An arrangement around a central shaft as disclosed herein allows for the stacking of magnetic gear elements to form a multistage magnetic gear, thereby increasing the gearing ratio dramatically. Secondly, marine propulsors achieve peak performance at relatively low rotational speeds and high torques, while ungeared electric motors generally operate at higher speeds and lower torques. Therefore, the solution of the present invention, which decreases the speed of electric motors and increases the torque while maintaining a high efficiency energy conversion, is desirable in the marine propulsion technology sector. Additionally, by encapsulating the parts as disclosed herein, there is reduced need for pressure chambers or shaft seals, and the power density and reliability of the device is accordingly increased. Specifically, because the magnetic gearing system has no sliding contact—other than from engineered bearing surfaces—there are reduced frictional losses, leading to a boost in efficiency. This also means they do not wear, leading to longer mean time between failures than mechanical gears. In addition, in the event that one of the rotors becomes jammed, the magnetic gear will ratchet or slip, preventing damage to other system components. Reduced acoustic noise is an additional feature of the magnetic gear discussed herein.

Figure 1:
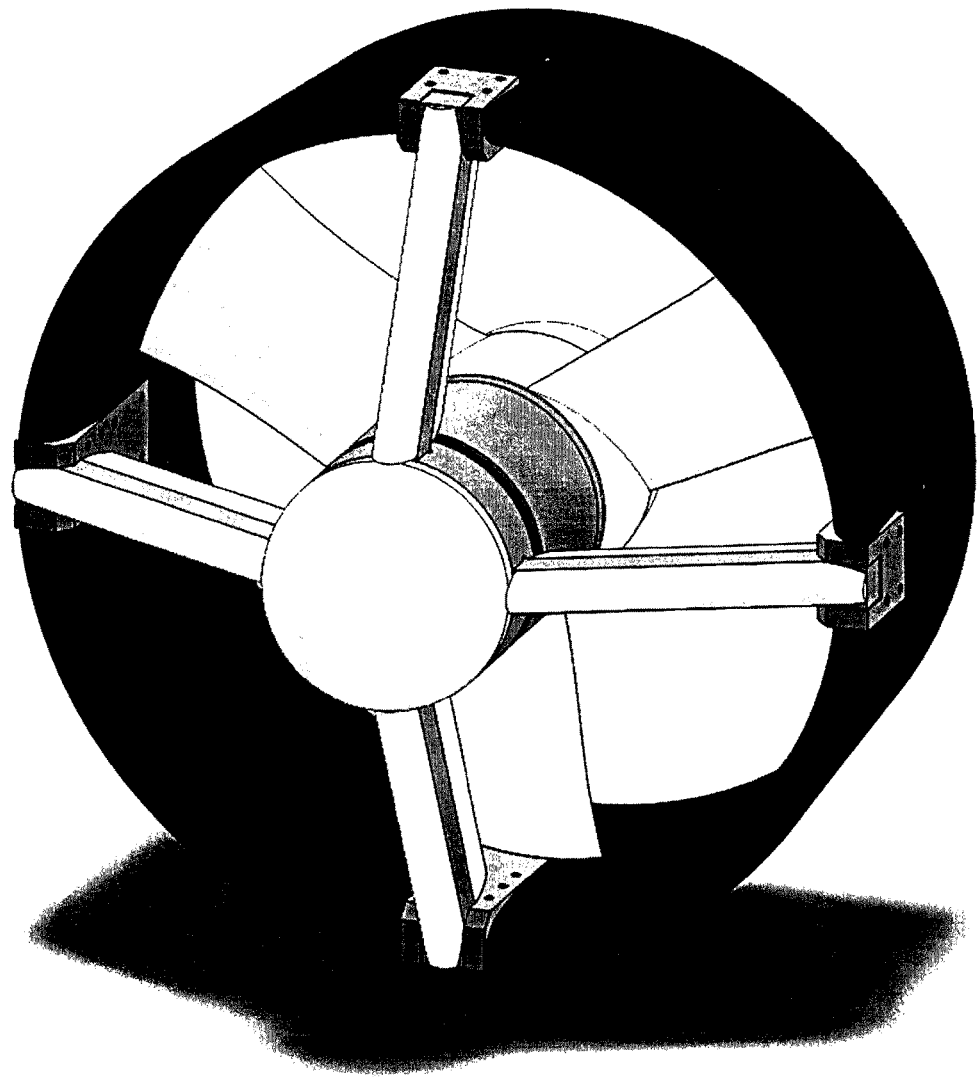
FIG. 1 is an isometric view of one embodiment of the thruster design of the present invention.
Figure 2:
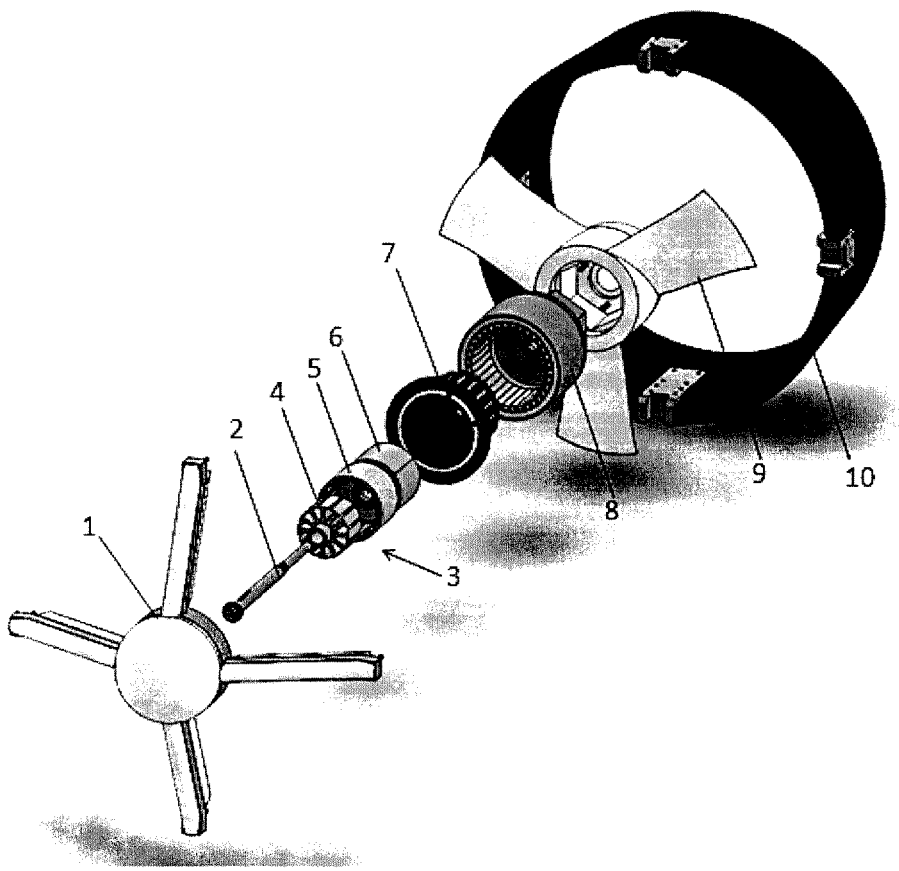
FIG. 2 is an exploded isometric view of the embodiment of the thruster design shown in FIG. 1.
Figure 3:
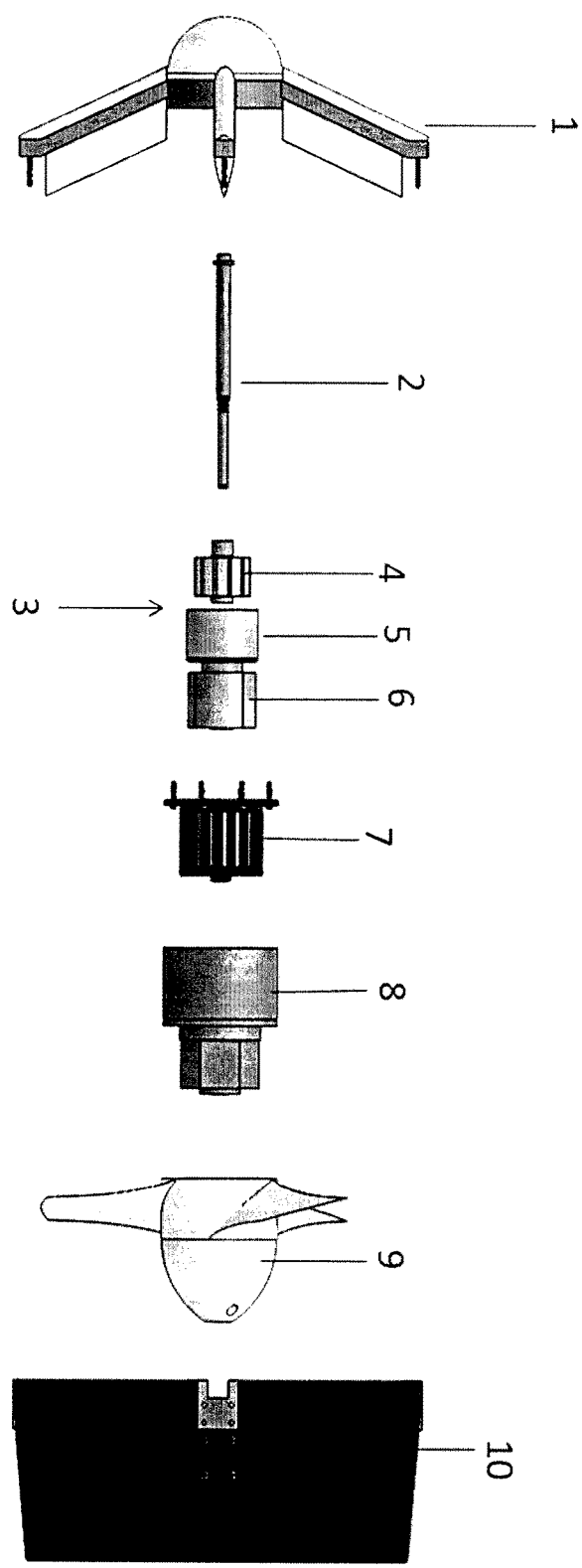
FIG. 3 is an exploded plan view of the embodiment of the thruster design shown in FIG. 1.
Figure 4:
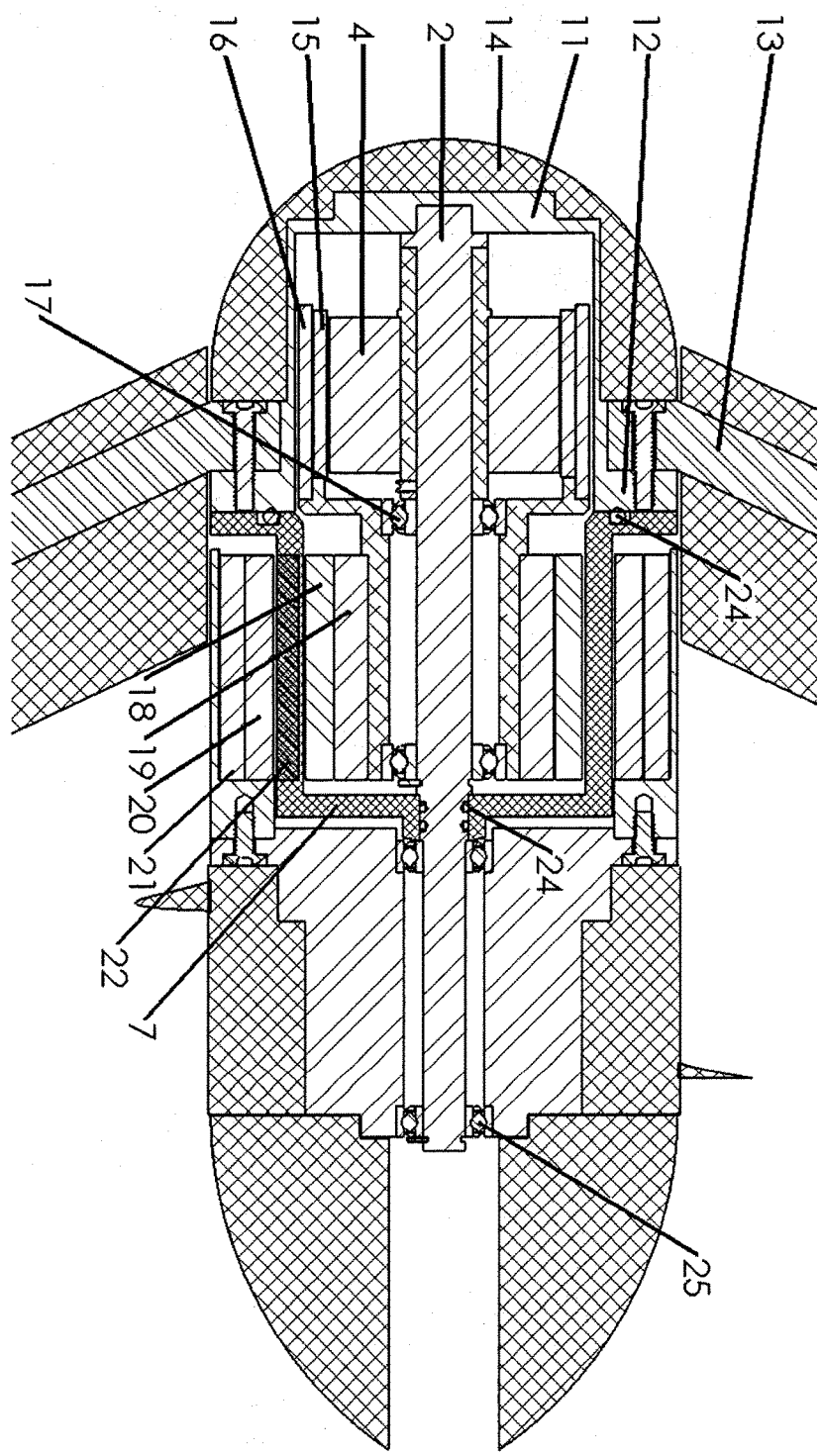
FIG. 4 is a cross-sectional view of the embodiment of the thruster design shown in FIG. 1.
Figure 5:
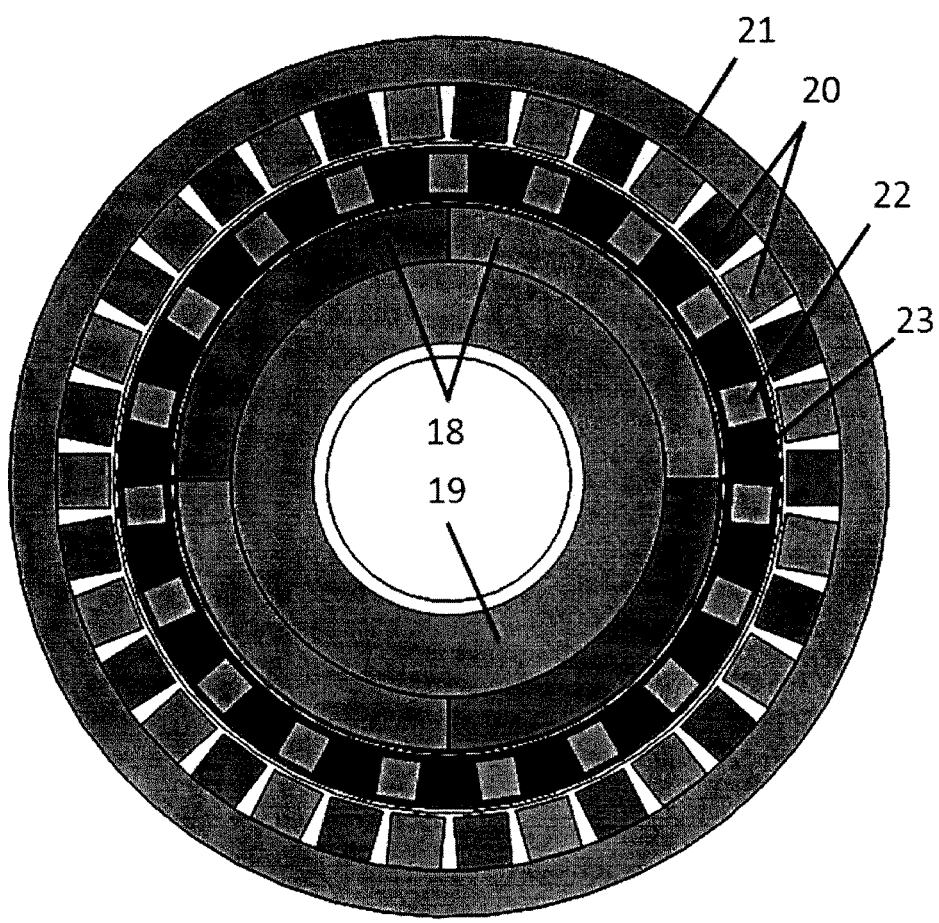
FIG. 5 is a schematic of an embodiment of the magnetic gear used in the thruster design of the present invention.

The invention of the present disclosure is more fully explained with reference to the Figures and the description that follows. FIGS. 1 and 4 show isometric and cross-sectional views, respectively, of one embodiment of the thruster design of the present invention. FIGS. 2 and 3 are exploded isometric and plan views, respectively, of this embodiment of the thruster to show the constituent parts of the thruster. With reference to FIGS. 2 and 3, the thruster essentially comprises 8 parts (seven of which are arranged on a central shaft to form an elegant assembly as discussed below). Motor mounting system 1 comprises a water proof shell 11 with a rigid flange 12 that forms the watertight enclosure for the DC motor (shown generally at 3) and control electronics (not shown). The rigid flange 12 serves as a connection point for the struts 13 which secure the shroud 10. The motor mounting system 1 receives one end of the central shaft 2, and includes water-tight ports (not shown) for receiving power and command input for the DC motor 3. A spherical fairing 14 improves hydrodynamic performance. The central ground shaft 2 is a hard, rigid, corrosion resistant shaft with grooves for O-rings 24, on which all stationary and rotating components are arranged. In particular, fixed components are held in place using keys (not shown), while rotating components utilize precision ball bearings 17 or bearing surfaces 25. The components are fixed axially through the use of mechanical stops, set screws and retaining rings (not indicated). The use of a central shaft 2 ensures concentricity, minimizes losses due to eccentric bearing rotation and radial loads and therefore improves bearing life. The central shaft 2 has the added benefit of ease of assembly and maintenance. The DC motor 3 comprises a motor stator 4 that is custom wound to maximize efficiency throughout the desired range of output torques and rotational velocities, and motor rotor 5 comprised of motor magnets 15 that are fixed within ferromagnetic backing 16, coupled to ground shaft 2 using precision ball bearings 17 to minimize power loss and constrained axially using a retaining ring (not indicated). The motor rotor 5 couples directly to the high-speed inner magnetic gear rotor 6. More particularly, and with reference to FIG. 5, the magnetic gear system has three main components. The first component is a high-speed inner magnetic gear rotor 6 consisting of a number of alternating permanent magnetic pole pairs 18. These are fixed to a ferromagnetic backing 19 in an effort to concentrate and contain magnetic flux. The second component is the low-speed outer magnetic gear rotor 8 which is similar to the high-speed inner magnetic gear rotor 6, except it has a greater number of permanent magnetic pole pairs 20 fixed to a ferromagnetic backing 21. The ratio of magnetic pole pairs 18 on high-speed inner magnetic gear rotor 6 to magnetic pole pairs 20 on low speed outer magnetic gear rotor 8 is what determines the gearing ratio. Between high-speed inner magnetic gear rotor 6 and low-speed outer magnetic gear rotor 8 lies the pole pieces 22 fixed within the pole piece fixture 23. The pole pieces 22 modulate the flux between the high-speed inner magnetic gear rotor 6 and low-speed outer magnetic gear rotor 8 and establish a flux harmony, allowing the magnetic gear rotors to "mesh". The pole pieces 22 are composed of sintered magnetic composite or laminations to reduce eddy current losses. With reference to FIGS. 2, 3 and 4, the pole piece fixture 23 is integral to the environmental barrier 7 and forms the stationary component of the magnetic gearing system. The environmental barrier 7 couples mechanically to the motor mounting system 1 and seals against the flange 12 and central shaft 2 through the use of static O-ring seals 24, and houses the pole pieces 22 used to modulate magnetic flux and achieve the required flux harmony. The pole pieces 22 are encapsulated with potting compound to secure their placement and prevent corrosion. The low-speed magnetic gear rotor 8 is coupled to the central shaft 2 on bearing surfaces 25, and comprises an alternating array of permanent magnet pairs 20 fixed to a ferromagnetic backing 21 to concentrate the magnetic flux. The permanent magnetic pole pairs 20 and ferromagnetic backing 21 in the low-speed outer magnetic gear rotor 8 are encapsulated using potting compound to protect from corrosive marine environment. The propeller 9 is a marine propeller, custom sized to provide maximum efficiency throughout the desired range of thrust and speeds. The propeller 9 is secured to the low speed magnetic gear rotor 8 using mechanical fasteners (not shown). A retaining ring (not indicated) axially constrains the low-speed magnetic gear rotor 8, while bearing surfaces 25 constrain the low speed rotor 8 radially. The shroud is a hydrodynamic foil that serves two main purposes. Firstly, it adds to the output thrust of the propeller 9 by creating a lifting surface, and minimizes the losses resulting from blade tip vortices. Secondly, it encloses and protects the propeller 9 from debris. In one embodiment, the shroud may also serve as the mounting point of the thruster. Propeller 9 is optimized for use within the shroud 10.

Figure 6:
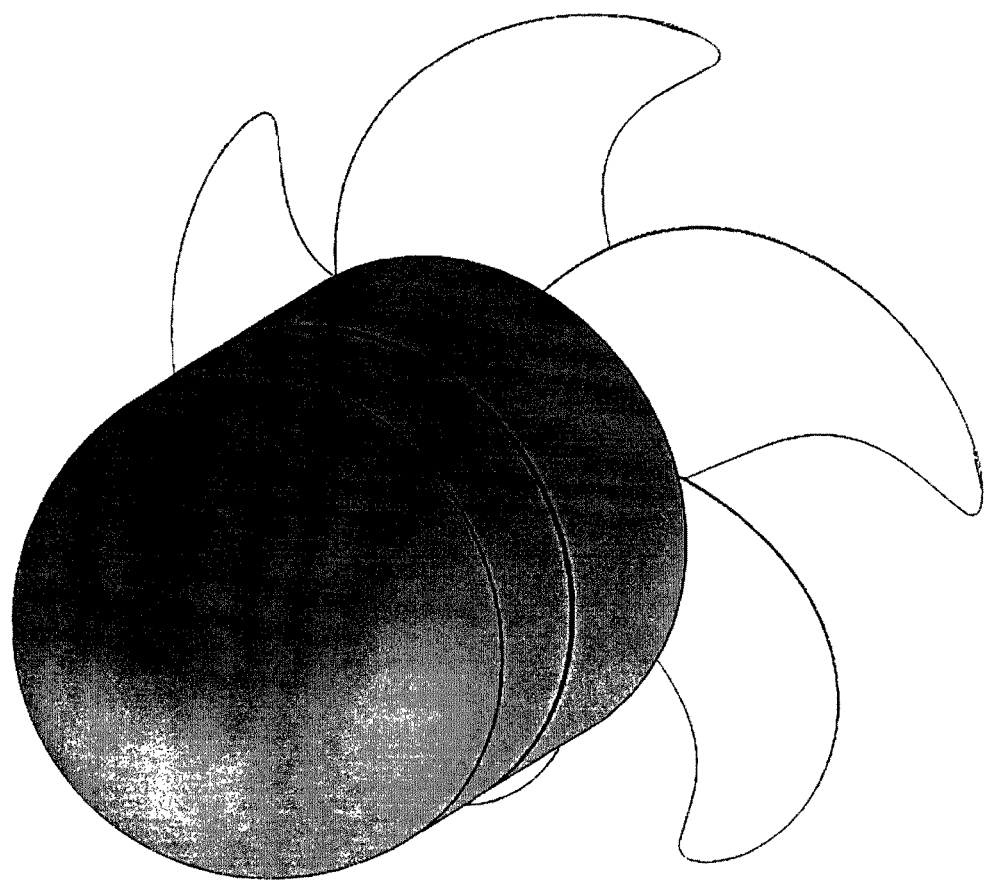
FIG. 6 is an isometric view of a second embodiment of the thruster design of the present invention.
Figure 7:
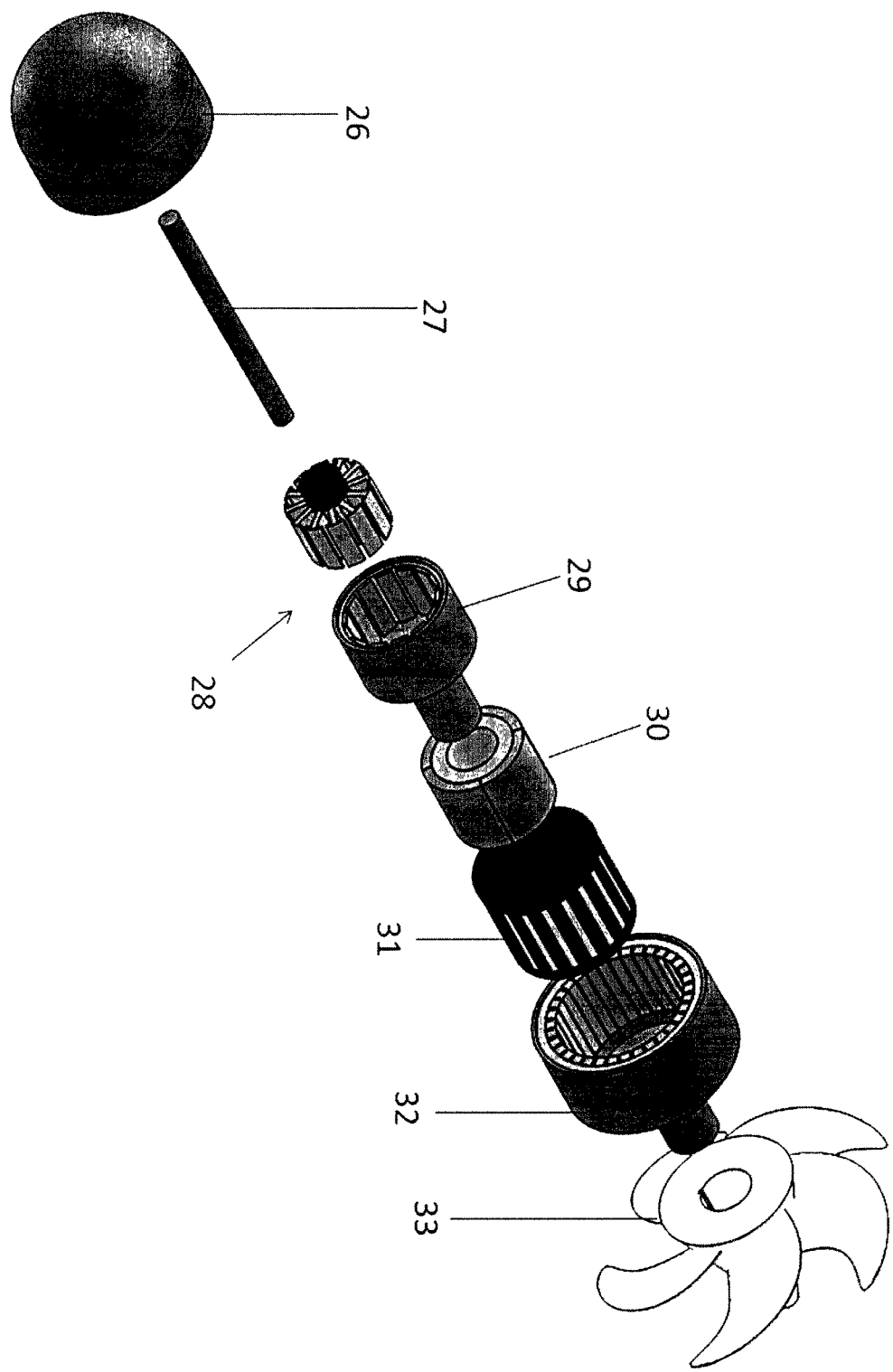
FIG. 7 is an exploded isometric view of the embodiment of the thruster design shown in FIG. 6.
Figure 8:
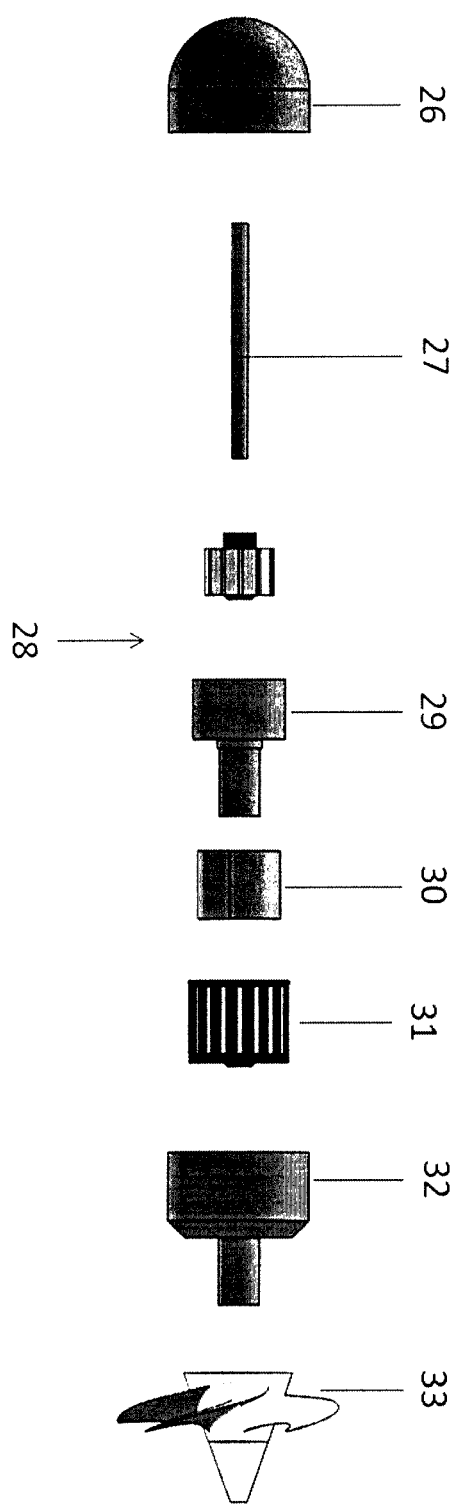
FIG. 8 is an exploded plan view of the embodiment of the thruster design shown in FIG. 6.
Figure 9:
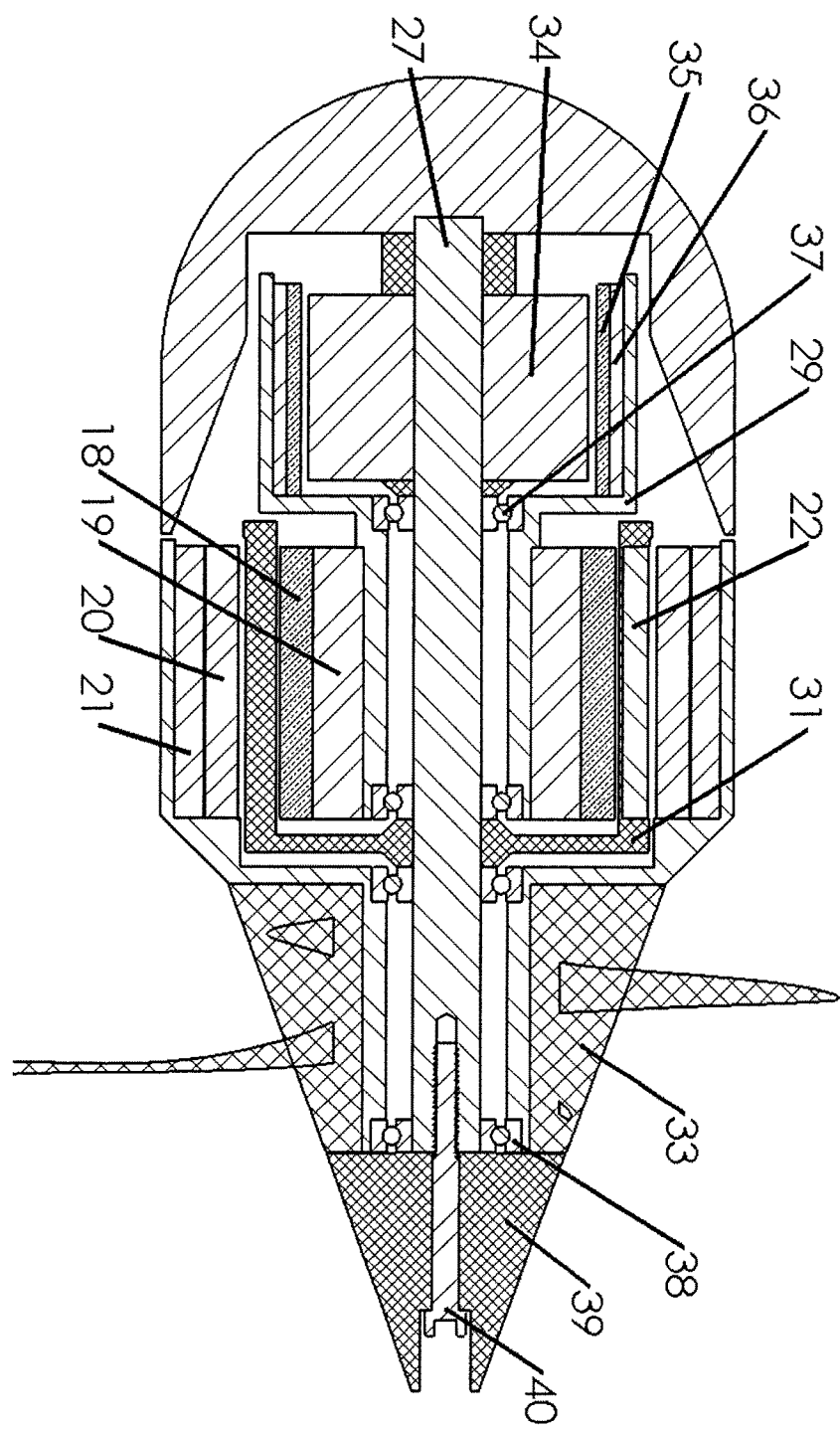
FIG. 9 is a cross-sectional view of the embodiment of the thruster design shown in FIG. 6.

FIGS. 6 to 9 show another embodiment of the present invention. As seen in FIGS. 6 and 9 which show isometric and cross-sectional views, respectively, the use of additional encapsulation in this embodiment further increases simplicity and allows for the "stacking" of components without the use of barriers. In this embodiment, the thruster is powered by a brushless DC motor (shown generally at 28) which has an encapsulated stator 34 and motor magnets 35 fixed to a ferromagnetic backing 36. The high-speed inner magnetic gear rotor 30 is fixed to motor rotor 29. The low-speed outer magnetic gear rotor 32 couples to the propeller 33. The intermediate magnetic gear-ring 31 houses the pole piece fixture 23 required for the operation of the magnetic gear system. All magnetic and ferrous components are encapsulated to prevent corrosion. All of the thruster components are arranged on a central shaft 27 forming an elegant assembly. Any non-rotating components are keyed to the shaft. The central shaft 27 allows the user to stack components allowing for multiple gear stages.

This embodiment of the present invention is more fully explained with reference to FIGS. 7, 8 and 9, which show exploded isometric, plan view and cross sectional views of this alternative embodiment of the thruster to show the constituent parts of the thruster. With particular reference to FIGS. 7 and 8, the thruster essentially comprises 8 parts, seven of which are arranged on a central shaft 27 to form an elegant assembly as discussed below. Motor enclosure system 26 mainly serves as a protective covering for the DC motor 28 and holds one end of the central shaft 27. Central shaft 27 is a hard, rigid, corrosion resistant shaft on which all stationary and rotating components are arranged. Fixed components are held using keys (not shown) and rotating components sit on precision ball bearings 37 or bearing surfaces 38. Using a central shaft 27 for all components ensures concentricity and minimizes losses due to eccentric bearing rotation and radial loads. The central shaft 27 has the added benefit of ease of assembly and maintenance. By extending the central shaft 27, additional gear stages can be stacked. With reference to FIGS. 7 to 9, the DC motor stator 34 is custom wound to maximize efficiency throughout the desired range of output torque and rotational velocity. The motor stator 34 and its windings (not shown) are encapsulated with a potting compound to protect them from the corrosive marine environment. The DC motor rotor 29 is lightweight and houses the motor magnets 35 and ferromagnetic backing 36, and transmits the rotational power of the motor. The motor magnets 35 and ferromagnetic backing 36 are encapsulated with a potting compound to protect them from the corrosive marine environment. The motor rotor 29 is coupled to the central shaft 27 using precision ball bearings 37 to minimize power loss. The motor rotor 29 is fixed directly to the high-speed inner magnetic gear rotor 30. More particularly, and once again with reference to FIG. 5, the magnetic gear system has three main components. The first component is a high-speed inner magnetic gear rotor 30 consisting of a number of alternating permanent magnetic pole pairs 18. These are fixed to a ferromagnetic backing 19 in an effort to concentrate and contain magnetic flux. The second component is the low-speed outer magnetic gear rotor 32 which is similar to the high-speed inner magnetic gear rotor 30, except it has a greater number of permanent magnetic pole pairs 20 fixed to a ferromagnetic backing 21. The ratio of magnetic pole pairs 18 on high-speed inner magnetic gear rotor 30 to magnetic pole pairs 20 on low-speed outer magnetic gear rotor 32 is what determines the gearing ratio. Between high-speed inner magnetic gear rotor 30 and low-speed outer magnetic gear rotor 32 are the pole pieces fixed within a pole piece fixture 23. The pole pieces 22 modulate the flux between the high-speed inner magnetic gear rotor 30 and low-speed outer magnetic gear rotor 32 and establish a flux harmony, allowing the magnetic gear rotors to "mesh". The pole pieces 22 are composed of sintered magnetic composite or laminations to reduce eddy current losses. With reference to FIGS. 7 to 9, the pole piece fixture 23 is integral to the intermediate magnetic gear-ring 31 and forms the stationary component of the magnetic gearing system. Pole pieces are encapsulated with potting material to secure their placement and prevent corrosion. The intermediate magnetic gear-ring 31 is keyed to the central shaft 27. The low-speed outer magnetic gear rotor 32 is coupled to the central shaft 27 through the use of bearing surfaces 38. The permanent magnetic pole pairs 20 and ferromagnetic backing 21 are encapsulated using potting compound to protect them from the corrosive marine environment. The propeller 33 is a marine propeller that is custom sized to provide maximum efficiency throughout the desired range of thrust and speeds. The low-speed outer magnetic gear rotor 32 is secured to the central shaft 27 using an end cap 39 and retaining screw 40.

In addition to the foregoing, there are a number of additional configurations and modifications that can be made to the aforementioned thruster configuration embodiments described above that could potentially result in a performance boost, increased reliability, or ease of fabrication/assembly/maintenance. In particular, regarding the pole pieces 22, because they are held in a plastic fixture, it could be beneficial to permanently mold them into the fixture rather than have them encapsulated. This would remove the need for an additional potting process and would ensure that the pole pieces 22 never come loose from their housing. In addition, the use of a shroud 8 with an underwater thruster is not a requirement. In this respect, the efficiency boost from a shroud can often be minor, and if the thruster is not expected to experience any debris a shroud may not be considered necessary as it adds to the overall size and weight of the thruster. Furthermore, in addition to using a central shaft as a mechanical ground, an exterior shell could be used. In this configuration, an interior rotor brushless motor would be coupled to the high speed inner magnetic gear rotor consisting of alternating permanent magnetic pole pairs 18 and ferromagnetic ring 19. The outer permanent magnetic pole pairs 20 and ferromagnetic backing 21 would be held stationary and the intermediate pole piece fixture 23 would serve as the low-speed output and would couple to the propeller.

ROVs benefit from increased power density as a result of the increase in the thrust to weight ratio of vehicles designed in accordance with the present invention, which leads to improved responsiveness. This increase in responsiveness can translate to increased operator performance and can decrease task completion times, which makes the improved ROVs attractive for use as inspection, intervention and survey class vehicles. Similarly, AUVs designed in accordance with the present invention benefit from increased propulsive efficiency. In particular, since AUVs must be self-contained with respect to their energy (usually in the form of batteries), an AUVs mission endurance is directly proportional to the amount of power used by all the systems on board. Optimal mission plans typically try to balance the power used by the propulsion system and the payload sensors in an attempt to traverse the maximum distance with the payload sensors in use. By increasing the propulsive efficiency, the thrust to the vehicle is increased for the same payload specifications, thereby increasing the overall speed with which an AUV completes a mission. Similarly, by maintaining the same speed for the same payload, the endurance of the AUV is extended, thereby increasing the amount of potential area covered by a survey. In view of the foregoing, operators of ROV and AUV systems comprising the new propulsion systems of the present invention can see increased efficiencies and cost-savings.

Although specific embodiments of the invention have been described, it will be apparent to one skilled in the art that variations and modifications to the embodiments may be made within the scope of the following claims.

We claim:

1. An encapsulated magnetically geared brushless electric drive consisting essentially of the following components:
a motor mounting system coupled to a first distal end of a central shaft, said mounting system comprising a water proof shell with a rigid flange connected to struts, and including water-tight ports for receiving power and command input;
a DC motor coupled to the motor mounting system, comprising a motor stator fixed to the central shaft and motor magnets fixed within a motor rotor which is coupled to the central shaft using precision ball bearings;
an inner magnetic gear rotor coupled to the motor rotor comprising an alternating array of magnets fixed to a ferromagnetic backing, the inner magnetic gear rotor operable at a first speed;
an environmental barrier coupled to the motor mounting system that seals against the motor mounting system and central shaft by means of O-ring seals, and that further houses pole pieces to modulate magnetic flux;
an outer magnetic gear rotor coupled to a second distal end of the central shaft comprising an alternating array of magnets fixed to a ferromagnetic backing, the outer magnetic gear rotor operable at a second speed that is lower than the first speed;
a propeller coupled to the outer magnetic gear rotor; and
a shroud coupled to the struts of the motor mounting system,
wherein each of said components are arranged axially around the central shaft using spacers and mechanical stops, and wherein said components are held in place by means of one of keys or bearings.

2. An encapsulated magnetically geared brushless electric drive consisting essentially of the following components:
a motor enclosure system that is coupled to a first distal end of a central shaft;
a DC motor stator coupled to the motor enclosure system, said stator encapsulated with potting compound;
a DC motor rotor coupled to the DC motor stator, said motor rotor housing motor magnets, said motor magnets encapsulated with potting compound;
an inner magnetic gear rotor coupled to the motor rotor comprising an alternating array of magnets fixed to a ferromagnetic backing, said inner magnetic gear rotor encapsulated with potting compound and operable at a first speed;
an intermediate magnetic gear-ring coupled to the central shaft housing pole pieces, wherein said pole pieces are encapsulated with potting compound and contained within a pole piece fixture;
an outer magnetic gear rotor coupled to the central shaft comprising an alternating array of magnets fixed to a ferromagnetic backing, said outer magnetic gear rotor encapsulated with potting compound and operable at a second speed that is lower than the first speed; and
a propeller coupled to the outer magnetic gear rotor, wherein each of said components are arranged axially around the central shaft using spacers and mechanical stops, and wherein said components are held in place by means of one of keys or bearings.

* * * * *